(12) United States Patent
Kipp et al.

(10) Patent No.: US 6,536,282 B1
(45) Date of Patent: Mar. 25, 2003

(54) SENSOR, COMPOSED OF A MULTILAYER SUBSTRATE, HAVING A SPRING ELEMENT THAT IS DELINEATED OUT OF A SEMICONDUCTOR LAYER

(75) Inventors: Andreas Kipp, Reutlingen (DE); Joerg Hauer, Reutlingen (DE); Markus Lutz, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/564,085

(22) Filed: May 3, 2000

(30) Foreign Application Priority Data

May 3, 1999 (DE) .......................... 199 20 066

(51) Int. Cl.[7] ........................... G01P 15/125; G01P 9/04
(52) U.S. Cl. ................... 73/514.38; 73/504.14
(58) Field of Search ................. 73/514.32, 514.38, 73/514.24, 504.12, 504.14; 361/280; 257/417

(56) References Cited

U.S. PATENT DOCUMENTS 5,487,305 A * 1/1996 Ristic et al. ............. 73/514.32

6,204,544 B1 * 3/2001 Wang et al. ................. 257/417

FOREIGN PATENT DOCUMENTS

DE         195 03 236         8/1996

* cited by examiner

Primary Examiner—John E. Chapman
(74) Attorney, Agent, or Firm—Kenyon & Kenyon

(57) ABSTRACT

A sensor, composed of a multilayer substrate, having a first semiconductor layer in which at least one spring element is configured using patterning, the spring element having two arms running essentially parallel to each other and joining to each other at one end segment, the first arm being mounted on a support block and the second arm being joined to a mass that is movable with respect to the support block, in order to avoid a fracture of the spring elements in response to powerful deflections perpendicular to the semiconductor layer. The at least one spring element is configured so that the end segments of the arms in the longitudinal direction of the arms in the plane of the semiconductor layer are directed so as to be initially bent away from each other and then so as to be bent towards each other, joining each other in a central bent area.

6 Claims, 3 Drawing Sheets

SENSOR, COMPOSED OF A MULTILAYER SUBSTRATE, HAVING A SPRING ELEMENT THAT IS DELINEATED OUT OF A SEMICONDUCTOR LAYER

BACKGROUND INFORMATION

A sensor is described, for example, in German Patent No. 195 03 236. In surface micromechanics, sensors of this type are manufactured from a multilayer semiconductor substrate. In this context, in a first semiconductor layer of the substrate, a movable mass is formed through patterning, the mass being mounted on support blocks of the substrate through a plurality of spring elements also delineated out of the semiconductor layer. The movable mass has electrode patterns which, together with further, fixed electrode patterns configured in the semiconductor layer, form capacitors. A deflection of the movable mass in opposition to the tensional force of the spring elements resulting from inertial and/or Coriolis forces changes the capacitance of the capacitors. The capacitance changes are used to determine acceleration or rotational speed.

The known sensors use U-shaped spring elements having two arms running parallel to each other, the arms projecting from a common connecting bar. The spring elements are designed so that they have slight rigidity in the direction of detection and great rigidity in the other two spatial directions. As a result, interfering influences can be suppressed. It has proven to be disadvantageous in the known sensors that the deflection of the movable mass perpendicular to the semiconductor layer resulting from a shock or impact leads to a fracture of the spring elements, which in this direction do not have great load-bearing capacity. Although it is possible to limit the deflection of the movable mass in the plane of the semiconductor layer using limit stops, the deflection of the movable mass perpendicular to the plane of the semiconductor layer cannot be prevented, since in this direction no limit stops can be formed for production technical reasons. In conventional sensors, therefore, a fracture in the spring elements in response to impact or shaking stresses cannot be avoided.

SUMMARY OF THE INVENTION

In the sensor according to the present invention, the disadvantages of the related art are avoided. This is achieved through the fact that the end segments of the arms of the at least one spring element in the plane of the semiconductor layer in the longitudinal direction of the arms are initially directed (shaped) so as to be bent away from each other and then are directed so as to be bent towards each other, joining each other in a central bent area. In this manner, in the connecting area of the two arms, curvatures are formed, which, in response to a deflection of the movable mass perpendicular to the semiconductor layer, reduce the maximum stresses arising in the material to values at which the risk of fracture of the spring elements can be significantly reduced. In addition, the spring element in the detection direction, running parallel to the semiconductor layer, has the necessary slight rigidity, so that a reliable deflection of the movable mass can be assured even in response to small accelerations. Advantageously, the geometry of the at least one spring element does not require any additional production expense in the manufacture of the sensor. As a result of the geometric configuration of the spring element, the reliability and the service life of the sensor are increased.

An exemplary embodiment of the present invention that is particularly advantageous is one in which the end segments of the two arms of the spring element joined to each other form a connecting area, which is composed of a plurality of spherically bent areas.

DETAILED DESCRIPTION

Figure 1:
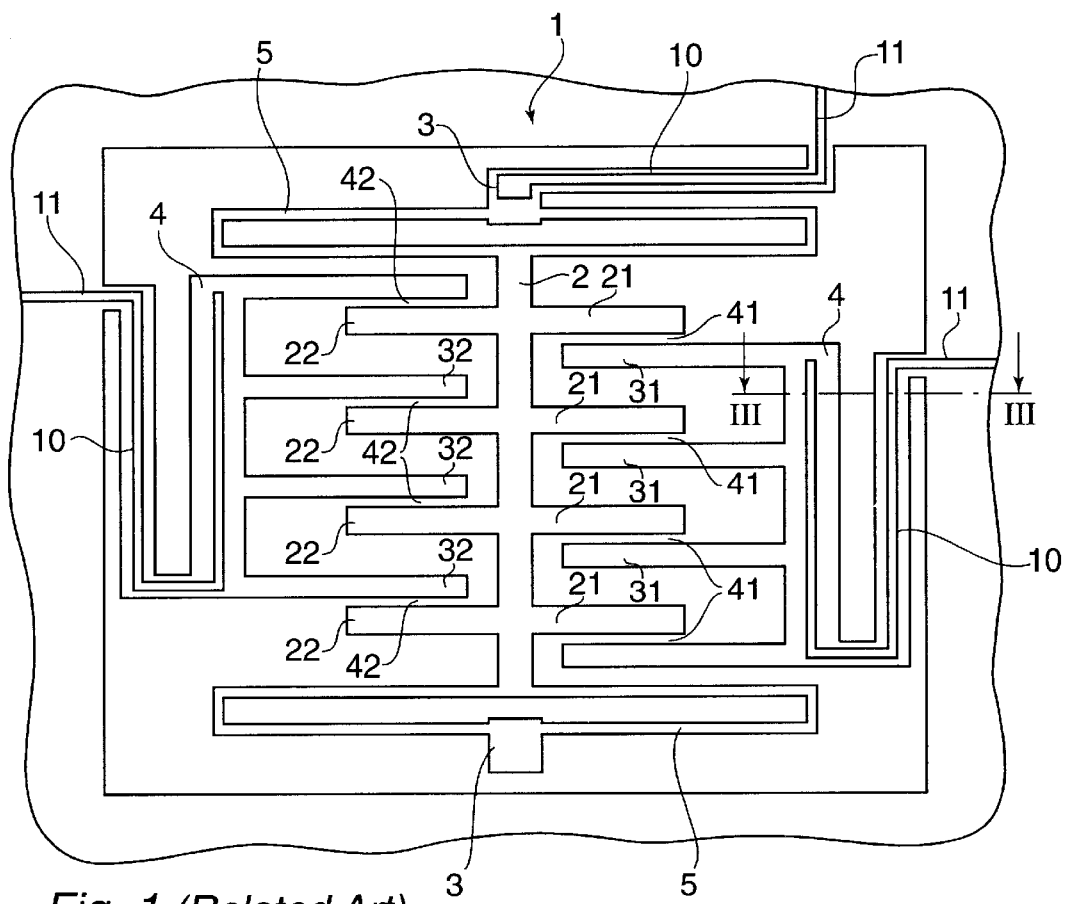
FIG. 1 depicts a view of an acceleration sensor having spring elements, known from the related art.
Figure 3:
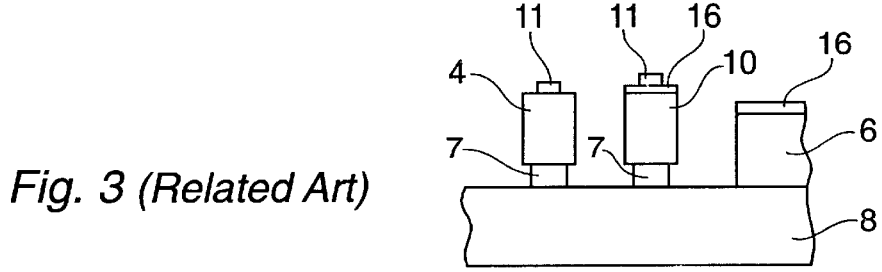
FIG. 3 depicts a cross-section of the sensor in FIG. 1 along the line III—III.

FIG. 1 depicts a view of an acceleration sensor known from the related art. The sensor has a movable mass, which is formed from central bar 2 and movable electrodes 21, 22. The movable mass is mounted on fixed support blocks 3 of the substrate using movable spring elements 5, and it can be shifted from its initial position by an acceleration along the longitudinal axis of central bar 2. Furthermore, the sensor has fixed electrodes 31, 32, which are suspended on support bar 4. Movable electrodes 21, 22 and fixed electrodes 31, 32 form capacitors 41, 42. In FIG. 3, a cross-section is depicted of the sensor in FIG. 1 along the line III—III. As can be seen from FIG. 3, the sensor is formed from a multilayer substrate, which includes a first semiconductor layer 6 of silicon and a second semiconductor layer 8.

The individual elements of sensor 1 are essentially delineated out of first semiconductor layer 6. Spring elements 5, central bar 2, and movable electrodes 21, 22 are delineated out of first semiconductor layer 6 and are at a distance from second semiconductor layer 8. Therefore, these elements are movable with respect to second semiconductor layer 8. Support blocks 3 of spring elements 5 are joined to second semiconductor layer 8 by a dielectric layer 7. Support blocks 3, in this example, are therefore fixedly anchored on second semiconductor layer 8. Furthermore, support bars 4 are joined to semiconductor layer 8 by dielectric layer 7. Thus support bars 4 are fixedly anchored on second semiconductor layer 8. Fixed electrodes 31, 32 are suspended on support bar 4. The geometric dimensions of fixed electrodes 31, 32 are selected such that the electrodes are only slightly deflected in response to acceleration. In contrast, spring elements 5 are configured such that as a result of an acceleration along the longitudinal axis of central bar 2 (detection direction), a deformation of spring elements 5 is caused. As can be seen in FIG. 1, movable mass 2, 21, 22 of sensor 1, having a total of four essentially U-shaped spring elements 5, is suspended on two support blocks 3. A deflection of central bar 2 causes the distance of movable electrodes 21, 22 from fixed electrodes 31, 32 to change. This change in the distance between the electrodes can be detected, by measuring the capacitance between movable electrodes 21, 22 and fixed electrodes 31, 32. The known sensor from FIG. 1 is used as a capacitive acceleration sensor.

For purposes of contacting the electrodes, provision is made for printed circuit traces 11, via which support blocks 3 and support bar 4 are contacted. As a result of printed circuit traces 11, a direct connection between sensor 1 and an evaluation circuit can be established. Since the layer thickness of first semiconductor layer 6 is large relative to the thickness of the printed circuit traces and the delineated-out elements have perpendicular edges, provision is made for connecting elements 10, which are arranged between support bar 4 or support block 3 and the rest of first semiconductor layer 6. Beyond these connecting elements 10, the printed circuit traces are routed so that they only have to traverse slight variations in height.

Support blocks 3, support bars 4, spring elements 5, support bar 2, and electrodes 21, 22, 31, 32 are strongly doped. As a result of this strong doping, it is assured that the electrodes function as capacitive plates, and thus the capacitances between electrodes are measurable. Connecting elements 10 are slightly doped. As a result of this measure, it is assured that the sensor is insulated with respect to first semiconductor layer 6. As a further result of this measure, the insulation of movable electrodes 21, 22 is assured with respect to fixed electrodes 31, 32.

Figure 2:
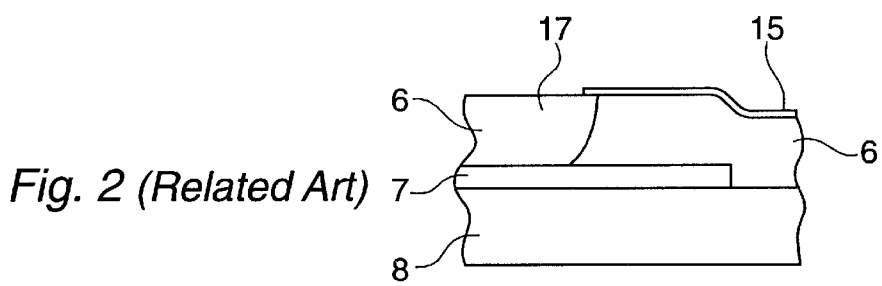
FIG. 2 depicts a cross-section of a multilayer substrate during the manufacture of the sensor in FIG. 1.

In FIGS. 2 and 3, the known manufacturing method of sensors is clarified. On a second semiconductor layer 8, for example a silicon wafer, a dielectric layer 7 and a first semiconductor layer 6 of silicon are applied. For dielectric layer 7, consideration is given to the conventional dielectric materials known from semiconductor manufacturing, such as silicon oxide, silicon nitride, or various glass layers. For the description below, it is assumed that the material for dielectric layer 7 is silicon oxide. Dielectric layer 7, as is shown in FIG. 2, can be arranged underneath the sensor patterning. If dielectric layer 7 is patterned, first semiconductor layer 6 is advantageously applied in a deposition process. For this purpose, for example, a polysilicon layer having a thickness of a few μm can be applied. First semiconductor layer 6 is then composed entirely of polysilicon. A further possibility lies in using a process that is known from semiconductor manufacturing for depositing epitaxial layers. First semiconductor layer 6 is then made of polysilicon only over dielectric layer 7, whereas in the areas in which first semiconductor layer 6 is in direct contact with monocrystalline second semiconductor layer 8, first semiconductor layer 6 is made of monocrystalline silicon.

The layer thicknesses that can be achieved using the epitaxial process are on the order of magnitude of 10 to 20 μm and are significantly thicker than when a process is used that deposits a polysilicon. In the epitaxy, a process is used that forms a weakly doped, high-resistance, first semiconductor layer 6 made of silicon. In order to assure that the sensor patterns are strongly doped and connecting elements 10 weakly doped, a diffusion zone 17 is introduced. For this purpose, a masking 15 is applied, beneath which no doping of first semiconductor layer 6 takes place. Using a plasma etching process, first silicon layer 6 is patterned (FIG. 3). In the process, support blocks 3, support bars 4, spring elements 5, central bar 2, electrodes 21, 22, 31, 32, and connecting elements 10 are delineated out of first semiconductor layer 6. As result of a masking, the areas of first semiconductor layer 6 that are not to be patterned are protected. Similarly protected are printed circuit traces 11, already applied, and passivation layers 16. Printed circuit traces 11 are insulated with respect to silicon layer 6 by a passivation layer 16. Only in the area of support blocks 3 or support bars 4 do printed circuit traces 11 rest directly on the silicon. Therefore, a contacting of the sensor only occurs at these points.

In a further etching step, dielectric layer 7 is then removed beneath spring elements 5, central bar 2, and movable electrodes 21, 22. This can take place by the multilayer substrate, after the patterning of first semiconductor layer 6, being acted upon by an etching medium, which etches dielectric layer 7. Due to the relatively broad dimensions of support blocks 3, support bars 4, and connecting elements 10, underneath them there remains a dielectric layer 7, assuming the etching is interrupted in time. Spring elements 5, central bar 2, and movable and fixed electrodes 21, 22, 31, 32, however, are geometrically dimensioned such that at this time point dielectric layer 7 underneath these elements has already been completely removed.

Figure 4:
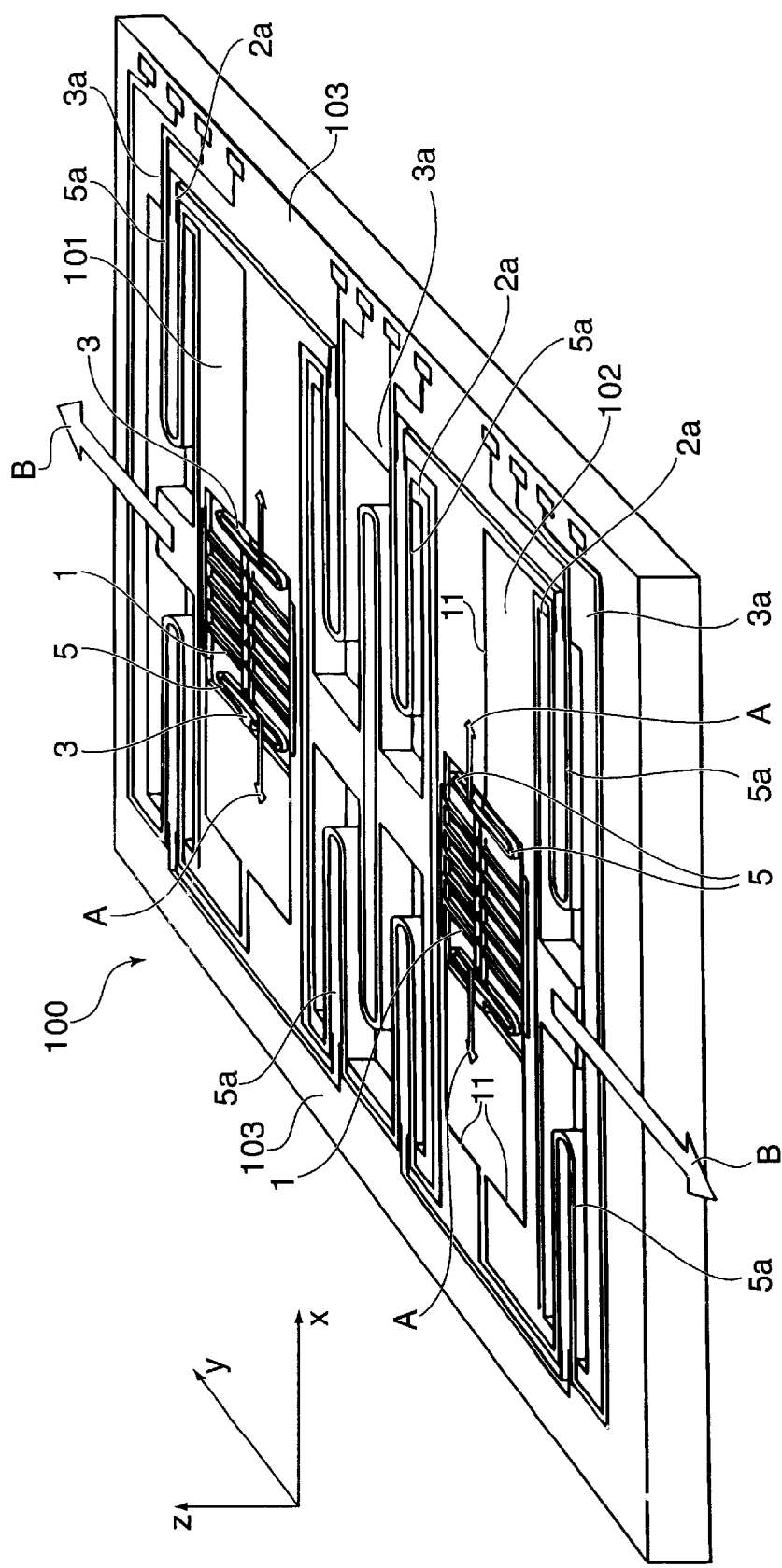
FIG. 4 depicts a perspective view of a known rpm sensor having spring elements.

FIG. 4 depicts a further sensor 100, known from the related art, that is composed of a multilayer substrate and that is used as an rpm sensor. Sensor 100 includes two acceleration sensors 1, depicted in FIG. 1. Each of two acceleration sensors 1 is mounted on a movable semiconductor plate 101 or a movable semiconductor plate 102, using four spring elements 5. Semiconductor plates 101, 102, at their edge segments 2a, are mounted, in each case, on support blocks 3a of a fixed semiconductor frame 103 using four spring elements 5a. During operation, semiconductor plates 101, 102 are set in vibration in the direction of arrow B. In response to a rotation of sensor 101 about the Z-axis in FIG. 4, acceleration sensors 1 are deflected in the direction of arrow A. In this manner, using sensor 100, rpms can be measured.

Figure 5:
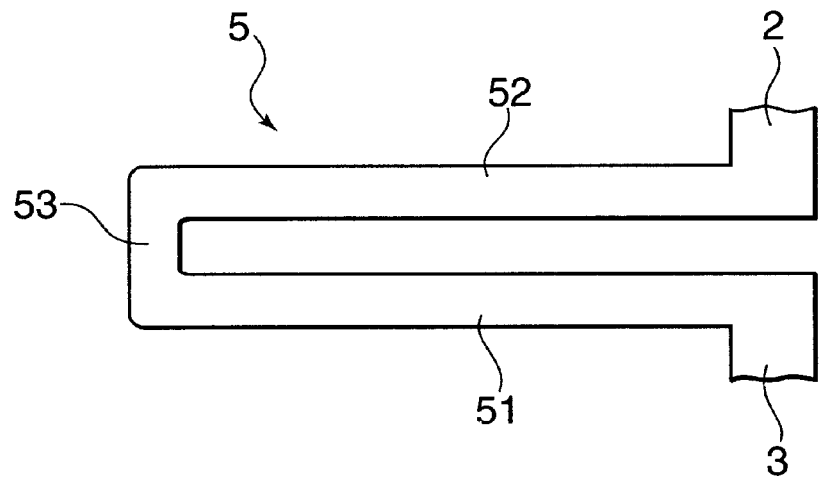
FIG. 5 depicts a spring element according to the related art.
Figure 6:
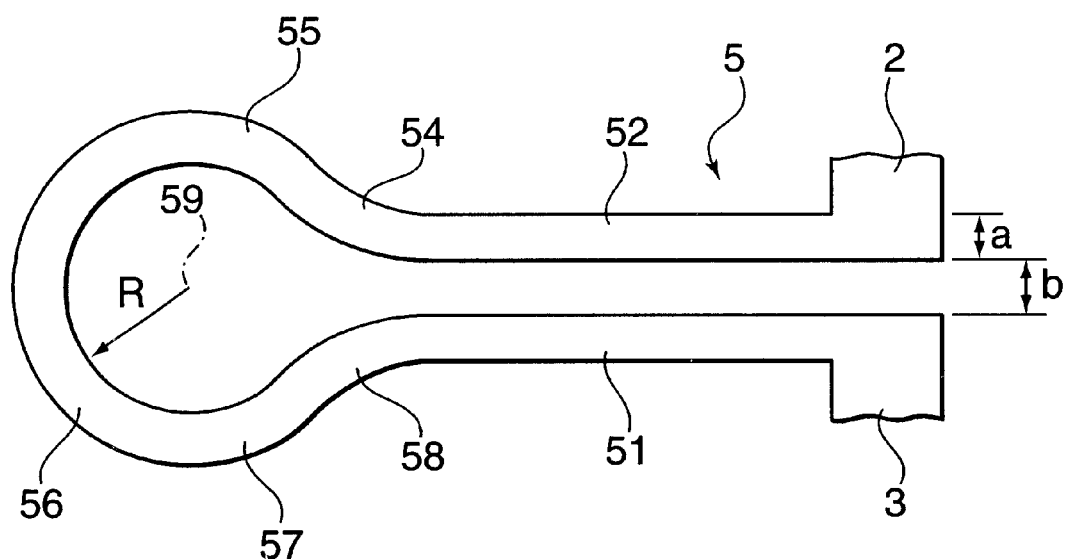
FIG. 6 depicts a spring element of the sensor according to the present invention.

The known sensors depicted in FIG. 1 and FIG. 4 use the geometry depicted in FIG. 5 both for spring elements 5 as well as for spring elements 5a, and they have two arms 51, 52 running essentially parallel to each other. A first arm 51 is joined at one end to support block 3. The other end of arm 51 is joined to a connecting bar 53, to which second arm 52 is also joined. The end of second arm 52 that is not joined to connecting bar 53 is joined to a mass 2 that is movable in relation to support block 3. As can best be seen in FIG. 4, the maximum deflection of spring elements 5, 5a in the x-direction and y-direction are limited by limit stops configured in the first semiconductor layer. However, in response to a deflection perpendicular to the plane of the substrate in the z-direction, no limit stops are present. Since the spring elements depicted in FIG. 5 are not capable of bearing heavy loads in response to a deflection in the z-direction, arms 51, 52 therefore break off from connecting bar 53. The sensor is thus rendered unusable. The load-bearing capacity of spring elements 5 in the z-direction can be improved by rounding off the edges formed by connecting bar 53 and arms 51, 52. In the sensor according to the present invention, spring elements 5, joined in one piece to first semiconductor layer 6, or spring elements 5a of the rpm sensor depicted in FIG. 4, are manufactured so as to have the geometry depicted in FIG. 6. Since the spring elements are manufactured by being etched out of first semiconductor layer 6, as described above, this is advantageously possible without large changes in the manufacturing process. As can be seen in FIG. 6, spring element 5, made of semiconductor material, for example silicon, has two arms 51, 52, running essentially parallel to each other and having a rectangular cross-section. Distance b of the arms from each other is, for example, 4 μm, and width a of one arm is also, for example, 4 μm. Arm 51 is joined at its end side to a support block, arm 52 to a movable mass. The support block, for example, can be support block 3, depicted in FIG. 4, fixedly joined to movable semiconductor plate 101, or support block 3a, fixedly joined to second semiconductor layer 8. The movable mass, for example, can be central bar 2, depicted in FIG. 1, or edge segment 2a of semiconductor plates 101, 102, depicted in FIG. 4. Support block 3, 3a therefore does not necessarily have to be fixedly anchored on second semiconductor layer 8, as is shown in FIG. 1. It is important that the movable mass and the support block be movable relative to each other.

As is further depicted in FIG. 6, the end segments of both arms 51, 52, facing away from support block 3 and from movable mass 2, are directed in the longitudinal direction of the arms in the plane of first semiconductor layer 6 so as to be initially bent away from each other and then directed so as to be bent towards each other, coming together in a central bent area 56. The connecting area of the two arms is here composed of, for example, five bent areas 54, 55, 56, 57, and 58. Central bent area 56 is configured so as to be roughly semi-circular or C-shaped. Central area 56 has connected to it two areas 55 and 57, that are bent by roughly one octant and that are bent roughly about the same center of curvature 59. To this are connected two further bent areas 54, 58, whose center of curvature lies above arm 52 and below arm 51, in FIG. 6. Bent areas 54, 58 have connected to them arms 51, 52. The width of the bent spring areas corresponds roughly to width a of arms 51, 52, but it can also be larger or smaller.

Interior radius of curvature R of central area 56 and of areas 55, 57 is here, for example, 11 $\mu$m and is, therefore, always significantly larger than distance b between arms 51 and 52. But other radii of curvature are also possible. Advantageously, radius of curvature R lies between 5 and 20 $\mu$m. It has proven to be advantageous to configure bent areas 54 through 58 as areas that are essentially spherically bent. In addition, it is also of course possible to use a curvature having a variable or nonspherical radius of curvature and, at the same time, to change the width of the bent areas. It is important that bent areas 54, 58, which are directly connected to the parallel segments of arms 51, 52, are first bent away from each other and then are bent towards each other until they join in a common area of curvature 56, without edges or folds. Edge structures on the exterior or interior wall of the spring elements in the connection area of the two parallel arms, which could result in a fracture of the spring elements in response to a deflection in the z-direction, are thus avoided.

What is claimed is:

1. A sensor comprising:
   a multilayer substrate;
   a first semiconductor layer;
   a support block;
   a mass movable relative to the support block; and
   at least one spring element formed in the first semiconductor layer using patterning, the at least one spring element having first and second arms, the first and second arms being joined to each other at end segments and extending substantially parallel to each other, the first arm being mounted on the support block, the second arm being joined to the mass, the end segments of the first and second arms in a longitudinal direction of the first and second arms in a plane of the first semiconductor layer being configured so as to be initially bent away from each other and then bent towards each other, joining each other in a central bent area.

2. The sensor according to claim 1, wherein the at least one spring element is composed of silicon.

3. The sensor according to claim 1, wherein the central bent area is substantially spherical.

4. The sensor according to claim 1, wherein an interior radius of curvature in the central bent area is larger than a distance between parallel arm segments.

5. An acceleration sensor, comprising:
   a multilayer substrate; a first semiconductor layer;
   a support block;
   a mass movable relative to the support block; and
   at least one spring element formed in the first semiconductor layer using patterning, the at least one spring element having first and second arms, the first and second arms being joined to each other at end segments and extending substantially parallel to each other, the first arm being mounted on the support block, the second arm being joined to the mass, the end segments of the first and second arms in a longitudinal direction of the first and second arms in a plane of the first semiconductor layer being configured so as to be initially bent away from each other and then bent towards each other, joining each other in a central bent area.

6. An rpm sensor, comprising:
   a multilayer substrate;
   a first semiconductor layer;
   a support block;
   a mass movable relative to the support block; and
   at least one spring element formed in the first semiconductor layer using patterning, the at least one spring element having first and second arms, the first and second arms being joined to each other at end segments and extending substantially parallel to each other, the first arm being mounted on the support block, the second arm being joined to the mass, the end segments of the first and second arms in a longitudinal direction of the first and second arms in a plane of the first semiconductor layer being configured so as to be initially bent away from each other and then bent towards each other, joining each other in a central bent area.

* * * * *